United States Patent
Busby et al.

(10) Patent No.: US 7,229,516 B2
(45) Date of Patent: Jun. 12, 2007

(54) FOAM BODIED GASKET AND GASKET TAPE AND METHOD OF MAKING AND USING THE SAME

(75) Inventors: Jeff Busby, Fort Worth, TX (US); Lane Smith, Fort Worth, TX (US)

(73) Assignee: Aviation Devices & Electronic Components, LLC, Fort Worth, TX (US)

( * ) Notice: Subject to any disclaimer, the term of this patent is extended or adjusted under 35 U.S.C. 154(b) by 93 days.

(21) Appl. No.: 10/607,432

(22) Filed: Jun. 26, 2003

(65) Prior Publication Data

US 2003/0234498 A1   Dec. 25, 2003

Related U.S. Application Data

(63) Continuation-in-part of application No. 10/212,341, filed on Aug. 5, 2002, now Pat. No. 6,695,320, which is a continuation of application No. 09/569,793, filed on May 12, 2000, now Pat. No. 6,530,577.

(51) Int. Cl.
*B29C 65/48* (2006.01)
*B32B 37/00* (2006.01)
*F16J 15/02* (2006.01)

(52) U.S. Cl. .................. 156/247; 156/306.6; 277/312
(58) Field of Classification Search .............. 156/91, 156/92, 228, 297, 306.6, 313, 71; 277/312, 277/590, 591, 592, 627, 628, 922
See application file for complete search history.

(56) References Cited

U.S. PATENT DOCUMENTS

| | | | |
|---|---|---|---|
| 3,126,440 A | 3/1964 | Goodloe | |
| 3,555,168 A | 1/1971 | Frykberg | |
| 3,993,833 A | 11/1976 | Esmay | |
| 4,076,098 A | 2/1978 | Ward | |
| 4,154,137 A | 5/1979 | Kobayashi | |
| 4,226,156 A | 10/1980 | Hyakutake | |
| 4,398,726 A | 8/1983 | Heisler | |
| 4,520,562 A | 6/1985 | Sado et al. | |
| 4,581,973 A | 4/1986 | Hoshino | |
| 4,649,793 A | 3/1987 | Blackshear et al. | |
| 4,745,839 A | 5/1988 | Peraino | |
| 4,776,254 A | 10/1988 | Cruz | |
| 4,868,967 A * | 9/1989 | Holt et al. | 29/450 |
| 4,900,877 A | 2/1990 | Dubrow et al. | |
| 5,370,991 A | 12/1994 | Remold-O'Donnell | |
| 5,375,889 A | 12/1994 | Nakashiba et al. | |
| 5,607,167 A | 3/1997 | Franckx | |
| 5,637,819 A | 6/1997 | Rogers | |
| 5,657,998 A | 8/1997 | Dinc et al. | |
| 5,702,111 A | 12/1997 | Smith | |
| 5,791,654 A | 8/1998 | Gaines et al. | |
| 5,868,399 A | 2/1999 | Schluter | |
| 6,231,050 B1 * | 5/2001 | Raden | 277/598 |
| 6,736,406 B1 * | 5/2004 | Provencher | 277/628 |
| 6,784,363 B2 * | 8/2004 | Jones | 174/35 GC |

\* cited by examiner

*Primary Examiner*—Chris Fiorilla
*Assistant Examiner*—Sing P. Chan
(74) *Attorney, Agent, or Firm*—Jackson Walker, LLP

(57) ABSTRACT

A novel gasket material. The gasket material has a foam core. The foam core is at least partially saturated with a curable polyurethane mix.

10 Claims, 16 Drawing Sheets

FOAM BODIED GASKET AND GASKET TAPE AND METHOD OF MAKING AND USING THE SAME

This is a continuation-in-part (CIP) and claims priority from Ser. No. 10/212,341 filed Aug. 5, 2002 now U.S. Pat. No. 6,695,320, which is a continuation of Ser. No. 09/569,793 filed May 12, 2000, now U.S. Pat. No. 6,530,577 issued Mar. 11, 2003.

BACKGROUND OF THE INVENTION

1. Field of the Invention

Gasket material, more specifically, a gasket material comprising a resilient, pliable body having a foam member embedded therein.

2. Background Information

A gasket is a sealing member for use between two mating surfaces to help prevent the movement of fluid or gas between the mating surfaces. Gaskets are often used on vehicles such as aircraft to prevent moisture from corroding the sealed off areas and the mating surfaces. For example, on the outside skin of an aircraft antenna are often mounted to assist in communications between the aircraft and a remote location. Such antennas often consist of a tabular mounting plate having an inner and outer surface, the inner surface mating to the outer skin of the aircraft and having an electrical connector projecting from the inner surface. The electrical connector is intended to fit partially into the interior of the aircraft through a small opening in the aircraft skin designed for such purpose. The electrical connector element will connect to the appropriate electrical circuit in the aircraft. On the outer surface of the mounting plate, and often incorporated with the mounting plate, is the antenna transceiving member for transmitting and/or receiving radio frequencies.

Traditionally, the antenna is removably mounted to the aircraft through typical threaded fasteners. Holes in the tabular mounting plate of the antenna support the threaded fasteners which pass into the aircraft's skin, typically threading into blind nuts mounted against the inside surface of the aircraft's skin.

Gaskets typically are provided for covering a portion of the "footprint" of the antenna against the outer surface of the aircraft. When the fasteners are tightened down, they compress the gasket typically with some deformation, between the aircraft's skin and the inner surface or face of the antenna mounting plate. This is done in an effort to prevent moisture from penetrating the gasket barrier.

However, prior art gaskets have a number of shortcomings which applicants novel gasket material overcomes. These shortcomings include allowing moisture to penetrate the area between the antenna and the aircraft's skin. Often, for example, a site of corrosion is the junction between the antenna inner surface and the electrical connective elements of the antenna. Moisture has been found to "pool" in this area, accelerating corrosion. Further shortcomings of the prior art gaskets include their moisture content or moisture absorption ability, which moisture may encourage the formation of corrosion, when the gasket is under pressure between the mating surfaces and, especially, where such gasket includes a metallic element. Further shortcomings of the prior art gaskets include their "non-selective retentivity." This means that after the gasket has been installed and in use for a period of time, that upon an attempt to separate the antenna from the aircraft's skin, some portions of the gasket will non-selectively stick to portions of the aircraft's skin and other portions of the gasket will stick to the antenna (see FIG. 1A.). The result, often, is the destruction of the gasket.

Applicants have invented a gasket with a novel combination of properties and qualities that effectively prevent moisture from passing the sealed area while maintaining selective retentivity. This allows the effective separation between the mating surfaces upon removal of the antenna.

Flexibility, resiliency, compressibility and pliability are other favorable properties which help affect a good seal between the mating surfaces.

All of these beneficial properties should have a useful life that is reasonable in view of operating conditions and aircraft maintenance schedules. The gasket should be inert, that is non-reactive with the work pieces (typically aluminum) as well as non-reactive to water, including salt water.

Not surprisingly, it has proven to be a challenge to develop a gasket with these properties that will survive repeated heat and pressure cycling (as the aircraft climbs and descends), structural flexing, and vibration while protecting the aircraft components and having a useful life.

While some of the prior art gaskets have provided some of the favorable properties set forth above, none have provided all of these properties in an aircraft gasket with a useful life. Such typical useful life would be a minimum of greater than one year under proper torque specifications.

Applicants, however, provide for all of the above properties in an aircraft gasket and gasket tape and a novel method of manufacturing the aircraft gasket and gasket tape. Gasket tape is gasket material that is rolled into tape rather than precut to the pattern of the mating surfaces. Applicants further provide for a method of using the preformed gasket with a liquid setable gel too, in some cases, help insure a waterproof seal.

Applicants have also found a novel method of preparing a gasket material. Applicants provide a gasket with the following beneficial properties, heretofore unavailable in a preformed gasket or a gasket tape: elasticity (with memory), low water absorption, low water content, leak free (especially of silicon oil), dessication resistant, compressibility and surface tackiness (including selective retentivity).

The elasticity and pliability helps make an effective seal between the two mating surface as compression against such elasticity helps seal over mating surface irregularities and structural flexing or vibration of the two surfaces. The maintenance of this elasticity property is important since the surfaces undergo thermal expansion and contraction during repeated altitude and temperature changes which causes relative movement (flexing) between the mating surfaces.

Low water absorption and low water content is also a beneficial quality as it is typically water or moisture that the gasket is meant to keep out.

Nor should a gasket material itself be the source of oil, as such oil can mar the finish of the aircraft surface. This oil leaching has been a problem with prior art gaskets including those silicon-based gaskets.

An additional beneficial property of an effective gasket includes a resistance to drying out. Drying out of a gasket brings the problem of shrinkage and break-up, which destroys the integrity of the gasket/mating surface.

Tackiness has been found beneficial since there is also vibration and flexing of the mating surfaces. Tackiness and resiliency provide a better seal should there be a slight separation between the mating surfaces.

SUMMARY OF THE INVENTION

Applicant's novel gasket consists of two parts. The first part comprises a skeletal member—typically an open-weave mesh member and, more typically, an open-woven mesh made of a metallic material or a non-metallic fabric such as fiberglass.

The second part of applicant's novel gasket is a flexible resilient body member typically formed around and through the skeletal member so that the skeletal member is substantially encapsulated within the resilient body member and gives some structure and form to the gasket.

The gasket and gasket tape are usually tabular in shape and the skeletal member and resilient body share a tabular shape and plane. However, when viewed in cross-section, Applicants skeletal member is not centered between the two opposed tabular surfaces of the gasket (or gasket tape), but instead is closer to one surface than the other. It is believed that this property provides selective retentivity to the material.

The resilient body is typically comprised of a semi-solid gelatin polyurethane, typically between 40 and 150 ($10^{-1}$ mm) cone penetration and having a surface tackiness of between about 2 to 7 inch pounds and which tackiness allows some adhesion to a metal mating surface, but will release easily and leave no residue upon release. The resilient body will not undergo dessication, does not leak oil, but retains memory and does not absorb more than about one percent by weight water. Other resilient, pliable bodies may be used, such as silicon or polyolefinic block copolymers or other materials with similar cone penetration and tackiness.

BRIEF DESCRIPTION OF THE DRAWINGS

FIG. 16 is a top elevational view of the dry open cell foam substrate or base used in applicants alternate preferred embodiment of novel gasket material set forth with the figures described herein below.

DETAILED DESCRIPTION OF THE PREFERRED EMBODIMENT

Figure 1:
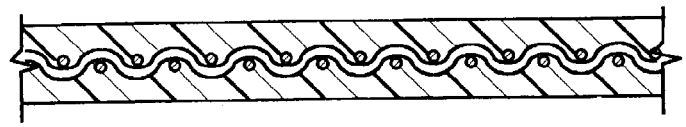
FIGS. 1 and 1A illustrate prior art gaskets and their use.
Figure 1A:
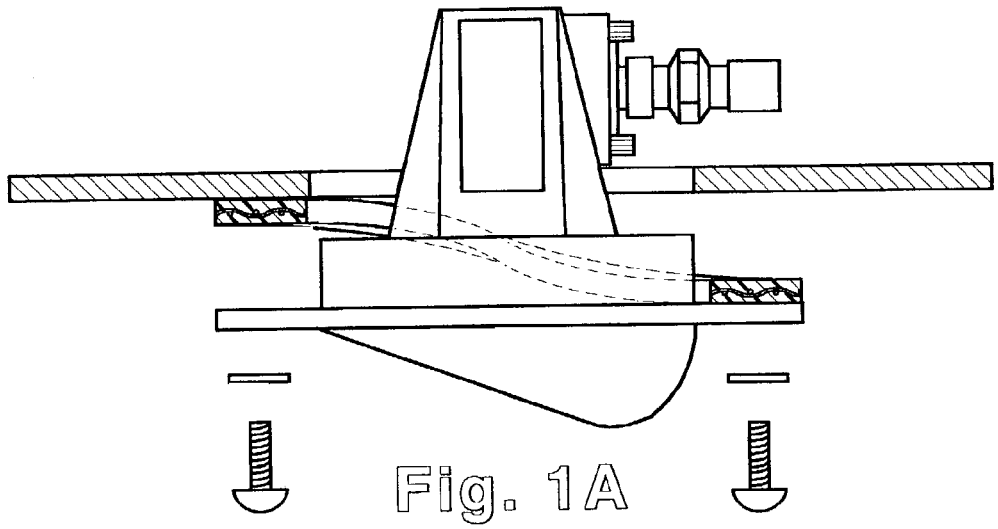
Figure 2:
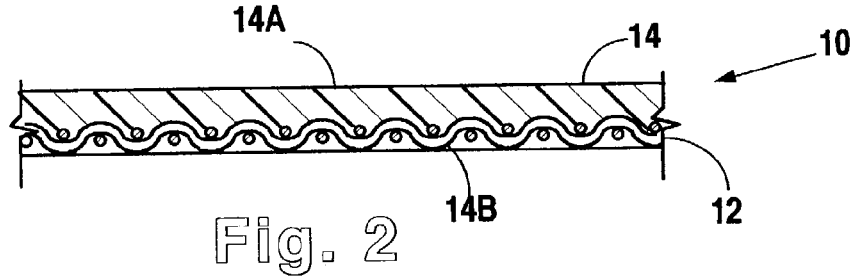
FIG. 2 is a cross-sectional view of Applicants preformed gasket.

FIGS. 1 and 2 illustrate a prior art gasket. In FIG. 1 the prior art gasket is seen to contain a woven, typically mesh member within a gel body. However, the mesh member is located in a central area of the gasket body between the two outer faces of the gasket. This is to be compared to Applicant's preformed gasket 10 as illustrated in FIG. 2. Applicant's preformed gasket 10 has a metallic skeletal member 12 (or non-metallic skeletal member 12A, see FIG. 14) wherein the skeletal member lays close to or adjacent one of the two outer surfaces of the gasket. One beneficial result of this placement is that Applicant's gasket has selective tackiness or retentivity, unlike prior art gaskets. Without such selective retentivity or tackiness, when prior art gaskets undergo tension during the release of the mating surfaces as illustrated in FIG. 1A (Prior Art) one face of the gasket often sticks to one mating surface and the other face of the gasket to a second mating surface. Such a result may be damaging to the gasket, preventing its reusability.

As seen in FIG. 2, Applicant's preformed gasket or gasket tape (FIG. 7) includes a skeletal member which may be metallic 12 or nonmetallic 12A. A typically woven skeletal member is, more typically, a woven aluminum mesh of thickness typically between 0.11 to 0.25 mil. Non-metallic mesh 12A (see FIGS. 13 and 14) may be woven fiberglass, for example, as when used in Applicant's gasket tape 16 typically between 7 and 20 mil. Sources of 1010 aluminum wire mesh are Estey wire and woven fiberglass is available from Teague Lumber as part number 337,600.

Substantially encapsulating skeletal member 12 or 12A is a resilient body 14 typically a semisolid gel and more typically formed from a curable polyurethane mix. The resilient body includes a first surface 14A and an opposed second surface 14B, the two surfaces with parallel planes. A typical thickness of Applicant's preformed gasket 10 is 0.032 inches to 0.050 inches before compression. A typical thickness of Applicants gasket tape is between 0.032 and 0.060 inches before compression. The preformed gasket and tape share the same resilient body and both have a sticky or tacky surface typically in the range of 2 to 7 inch pounds.

Figure 3:
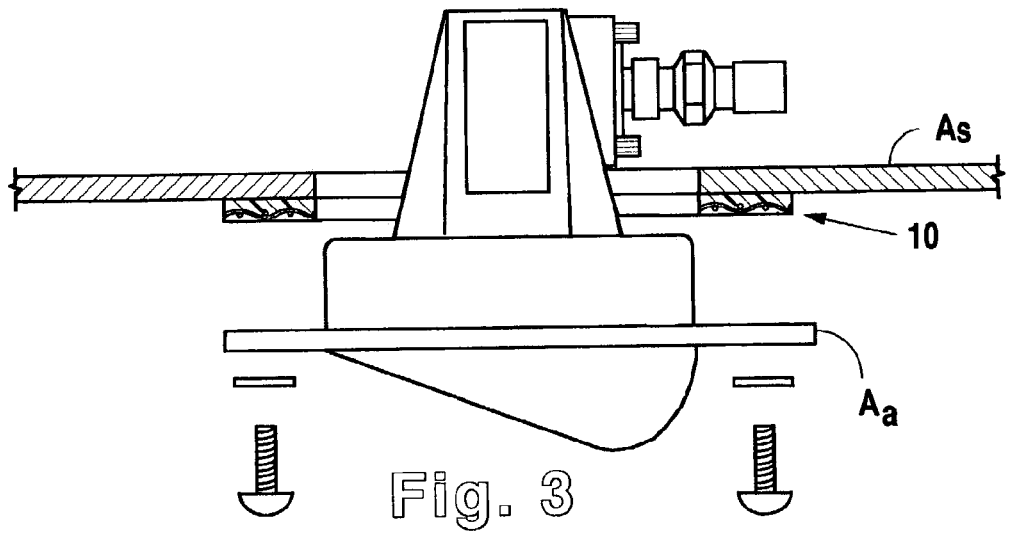
FIG. 3 is a side elevational view of Applicants preformed gasket in use.

FIG. 3 illustrates Applicant's gasket as it is used to mount between two mating surfaces, here aircraft skin As and aircraft antenna Aa, with preformed gasket 10 cut to dimensions dictated by the specifications of the antenna. It is placed between the aircraft skin and antenna and fasteners are tightened down typically to between about 15 and 35 inch pounds, to compress and slightly deform (squish out along the gasket edges) the gasket.

Figure 4:
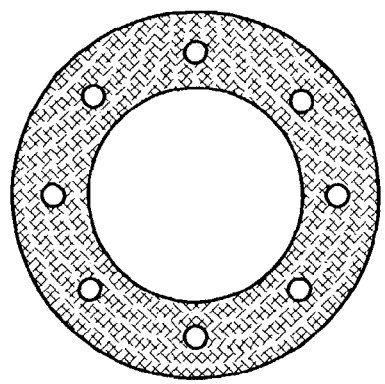
FIGS. 4, 5 and 6 are elevational views of various "footprints" of Applicants preformed gaskets.
Figure 5:
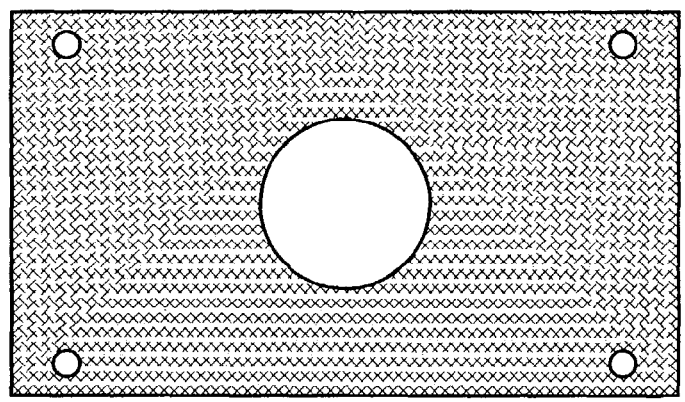
Figure 6:
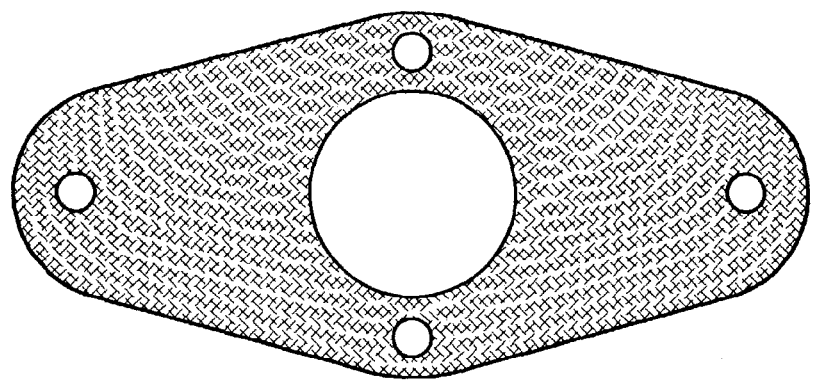

FIGS. 4, 5, and 6 illustrate three "footprints" available for Applicants preformed gasket.

EXAMPLE 1

Applicant provides in example 1 a preformed gasket 10 with a footprint similar to FIG. 4 with an inner diameter about 5 inches and an outer diameter of 7 inches. The gasket has a resilient body of about 40 mil thickness comprised of polyurethane from a curable mix available from KBS Chemical of Fort Worth, Tex. as part numbers P-1011 (polyol) and U-1010 (urethane). Aluminum mesh of about 22 mil thickness is used. The preformed gasket was installed on a commercial jet airliner (Boeing 737) between the aircraft skin and the aircraft antenna to between 15 and 35 inch pounds pressure. The resulting compression allowed the wire mesh to ground the antenna to the skin, with the making surfaces about 20 mil distance apart. Upon removal, after 7 months of service, there was observed clean separation of the antenna from the gasket and the gasket maintained adhesion to the aircraft skin, expanding to about 40–90% of its original thickness and shape. The gasket did not dry out, and maintained its structural integrity and other chemical and physical properties, providing an effective seal.

EXAMPLE 2

A second gasket, similar in dimensions and structure to that set forth in Example 1, was joined between two mating surfaces under conditions similar to Example 1 and underwent 1,554 hours of salt fog testing per ASTM B 117. This gasket had a central cutout area in which a high tack, self leveling, green polyurethane sealant (Part No. U-1020 and P-1021 from KBS) was injected. The gasket was subject to a specified torque of 15 and 35 inch pounds. Upon release of the two mating surfaces the gasket was seen to maintain its integrity and to release clean from one mating surface of the two mating surfaces. It was seen to retain its resiliency and memory, as did the gasket in Example 1 above making an effective environmental seal.

Figure 7:
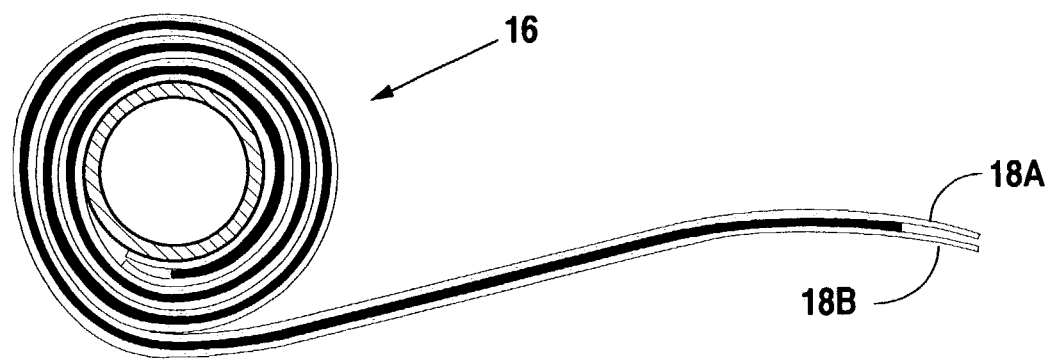
FIG. 7 is a cross-sectional elevational view of Applicants gasket tape.
Figure 8:
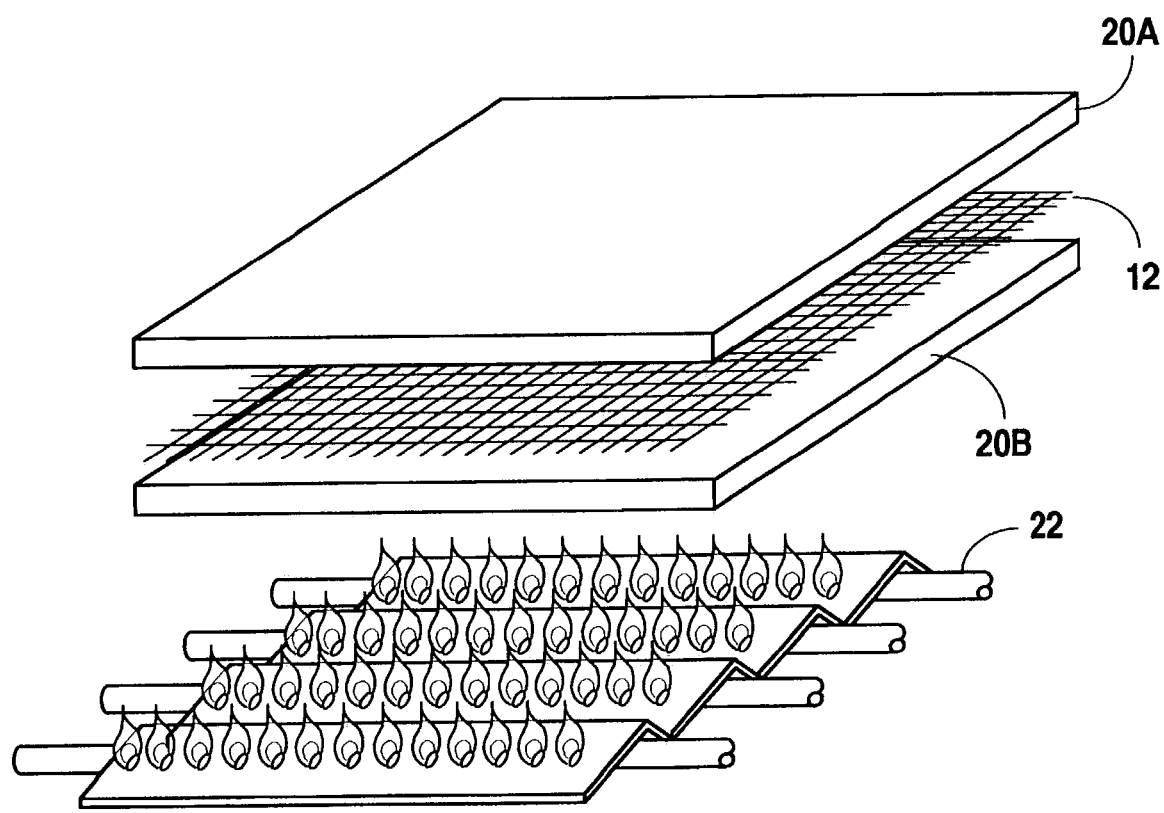
FIG. 8 is a perspective view of a step in the manufacture of Applicants preformed gaskets.

FIG. 7 illustrates the use of Applicant's unique gasket material in tape form 16, rolled up and available to be cut to length for placing between a pair of mating surfaces or as a self sealing tape. Applicant's tape 16 uses, typically, the same polyurethane body as preformed gasket 10 which has surface tackiness and has a mesh, 12A, typically woven fiberglass, that is closer to one of the two tape other surfaces then to the other. This is believed to result in Applicants unique selective retentivity.

FIGS. 8, 9, 10 and 11 illustrate a method of producing Applicant's precut gasket 10.

The first step is the flattening step. The purpose of this step is to flatten out a skeletal member 12. The way in which this is done, if the skeletal member is metallic wire mesh, is to place the wire mesh 12 between two flat weighed members 20A and 20B and then placing the weighed members with the wire mesh between them in an oven. The wire mesh is typically 18 inches by 24 inches and the weighed members are typically ¼" stainless steel plates. The mesh and weighed member are typically laid flat in an oven and heated to 600 degrees F. for about 30 minutes. This anneals the metallic wire mesh and keeps it flat. The metal plates and the wire mesh are then removed from the oven and allowed to cool. Following cooling the weighed plates are removed and the wire mesh is ready for placement onto flat table 24.

Figure 9:
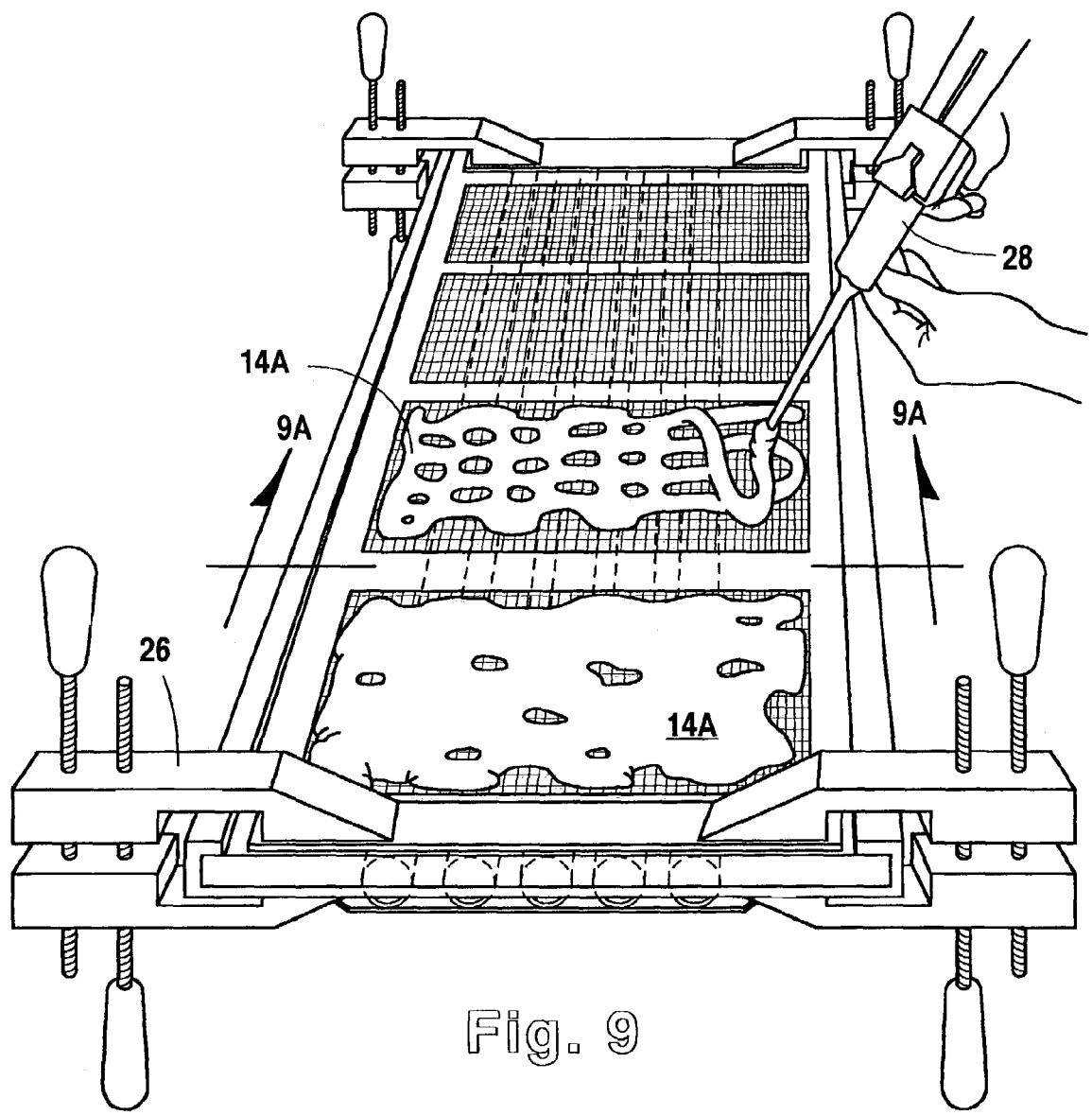
FIG. 9 is a perspective view of another step in the process of manufacturing Applicants preformed gaskets.
Figure 9A:
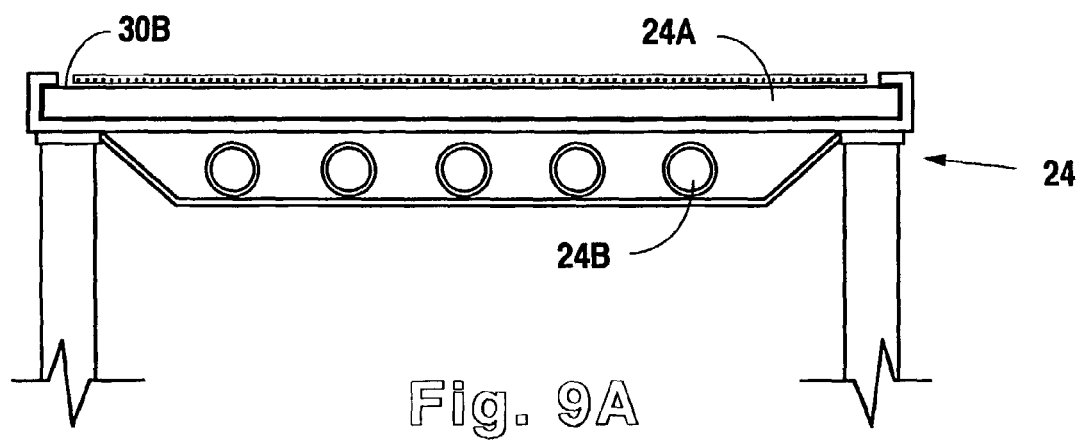
FIG. 9A is a side elevational view of a table for use in the method of manufacturing Applicants gasket material and illustrating Applicants gasket material on the upper surface thereof.
Figure 12:
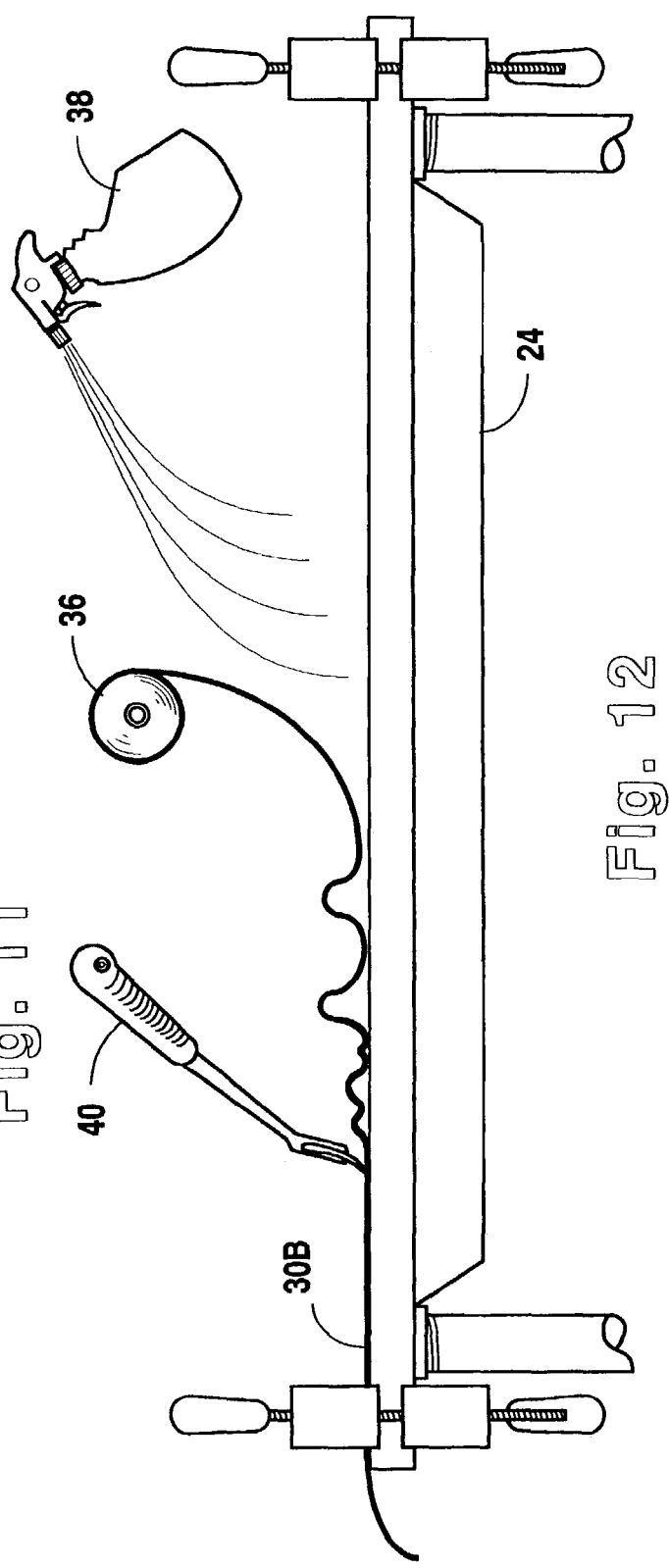
FIG. 12 is a side elevational view of a step undertaken in preparation for manufacturing Applicants gasket material.

At this point it is germane to examine the nature of flat table 24 in more detail. With reference to FIG. 9A, table 24 has legs and a table top. The table top typically includes a flat transparent glass member 24A with a flat upper surface. It also includes beneath the glass member 24A longitudinal aligned fluorescent lights 24B. Before placement of wire mesh 12 onto the glass table top a release sheet, such as an FEP sheet (fluorinated ethylene propylene) film is applied to the table top. The FEP film is inert and will not stick to the polyurethane mix or the cured mix and will allow a clean removal of the cured polyurethane mix, which comprises the resilient body, from the table top. It is noted with reference to FIG. 12 the FEP film is typically applied to the flat glass table top 24A from a roll, after Windex® an ammonia based cleaner 38 is applied to the surface of a table top and a squeegee 40 is used to squeeze out any air bubbles. This is done to insure a flat, bubble free surface for gasket formation. Thus, it is seen with reference to FIGS. 9A and 12 that table top 24A has been prepared prior to the placement of the flattened wire mesh on top thereof, with an FEP or otherwise suitable release film which will lay flat to the table top, be inert to the cure mix and allow the gasket material to release therefrom.

The next step in the manufacture of the preformed gasket, may be called the "mixing and pouring" step and is best illustrated with reference to FIG. 9. In FIG. 9 it is seen that a mix applicator 28 containing a curable mix of resilient body such as a mix of polyol and urethane available from KBS Chemical as set forth above, is applied to the mesh through the applicator. The prior art applicator stores the liquid mix typically as a resin (here urethane) and hardener (here polyol) in the body thereof, but injection through the nozzle thereof allows the two compositions to mix. Thus, in the process of pouring or applying the resilient body liquid mix, the two components are typically combined. This application and pouring step is typically done at room temperature. Moreover, it is noted that the resilient body liquid mix is self leveling. This step may also be done as two separate steps. First, one could separately mix the two components of the curable mix and, before it begins to set, apply it by pouring or any other suitable manner, onto the skeletal member.

With a minimum practice and experience the proper amount of liquid mix for the mesh may be determined. That is, sufficient liquid mix should be applied to the mesh for it to sufficiently cover the mesh such that the resilient body contains the wire mesh closer one surface than the other (see FIG. 2). For example, it been determined that using a 10½ inch by 17 inch 22 mil aluminum wire mesh such as set forth above, one applies about 160 milliliters of mix, typically, in the crisscross or zig zag pattern as illustrated in FIG. 9. This will typically result in a gasket of about 40 mil thickness.

Figure 10:
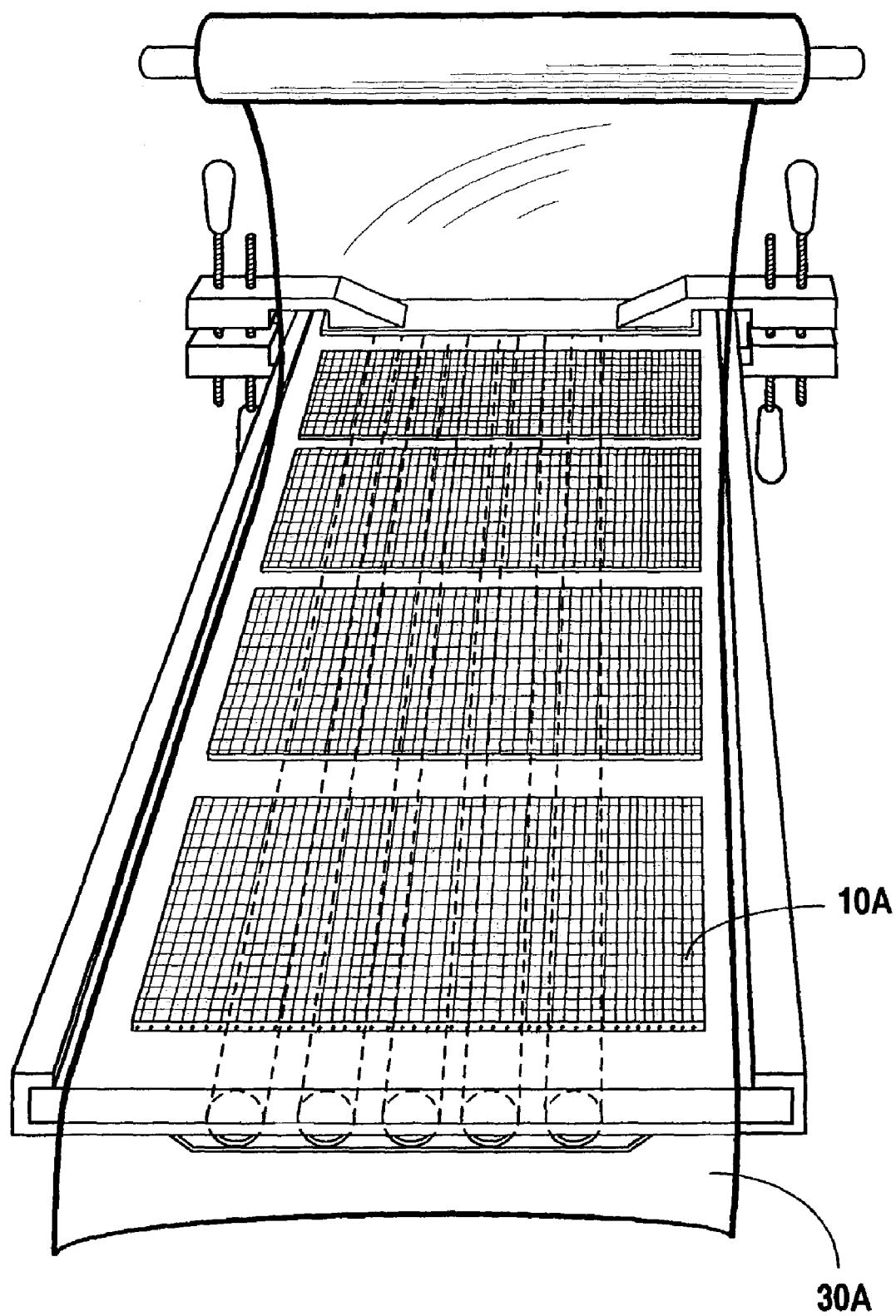
FIG. 10 is a perspective view of a manufacturing step in preparing Applicants gasket material.

The next step in preparing Applicant's preformed gasket is to allow the liquid mix to cure. Typical time to curing is about 4 hours at room temperature. Upon curing a second FEP layer here 38 (see FIG. 10) is applied to the top surface of the gasket stock 10A as seen in FIG. 10. This second layer of FEP material will help protect the gasket stock in handling and also will release easily from the surface therefrom.

Figure 11:
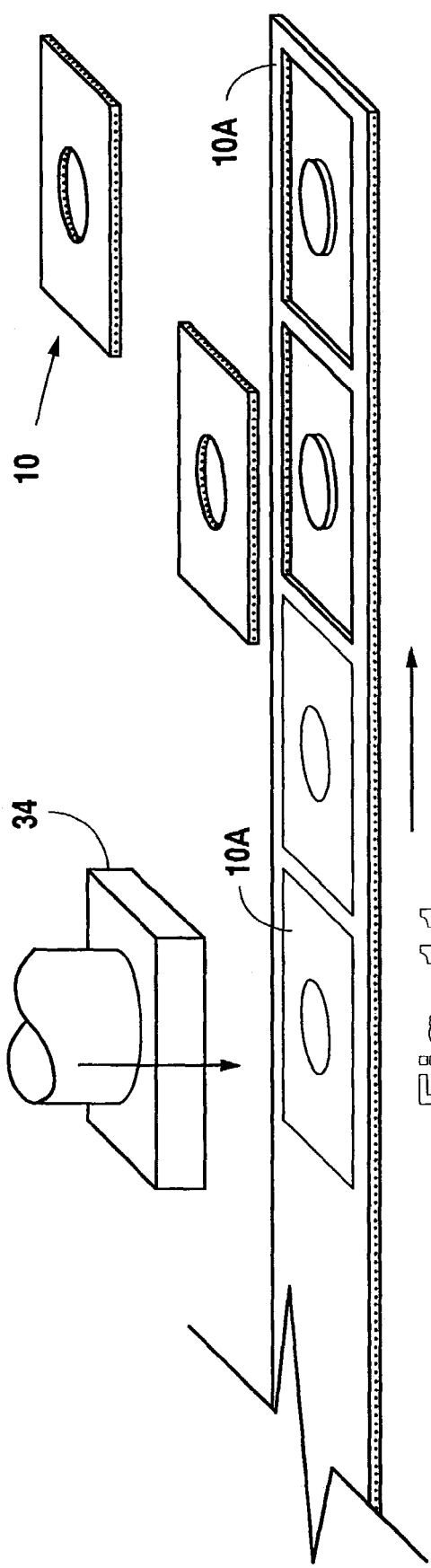
FIG. 11 is a perspective view of a step in the manufacturing of Applicants preformed gaskets.

Further in FIG. 11 it is seen that gasket stock 10A may be cut with a die stamp machine 34 in ways known in the trade to form precut gaskets 10 to any number of suitable configurations (see for example FIGS. 4, 5 and 6).

Figure 13:
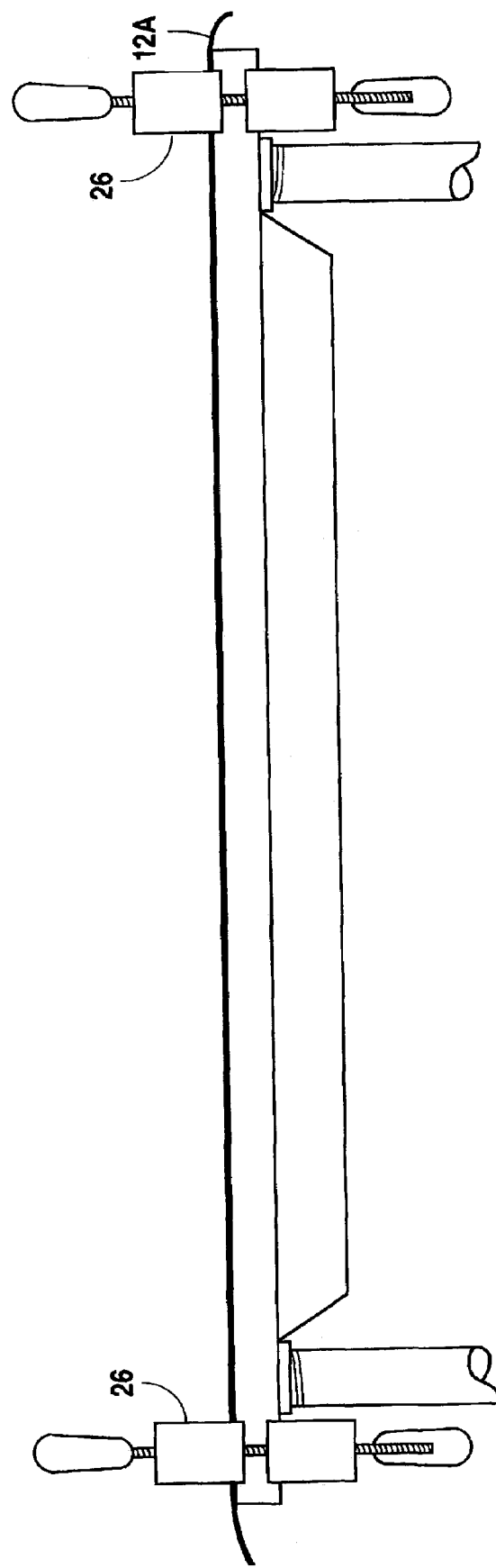
FIG. 13 is a side elevational view of a table for use in the manufacture of Applicants gasket tape illustrating the stretching and clamping of a woven, non-metallic fiberglass member against the upper surface of the table, the table upper surface having been covered with a release film.

FIG. 13 illustrates a manner for making Applicant's gasket tape 16. This involves the step utilizing a table such as is illustrated in FIG. 9A and stretching a non-metallic skeletal member 12A from a roll or other stock of such material under tension atop the FEP layered table. Some tension and clamping is necessary to insure that the mesh 12A is maintained flat against the FEP bottom layer 30B.

The mixing and pouring step is similar to that illustrated in FIG. 9, with the same resilient body liquid mix as used in the preformed gasket 10, coating all of the skeletal member to a thickness sufficient to place the skeletal member closer to one surface of the gasket tape than the other.

Figure 14:
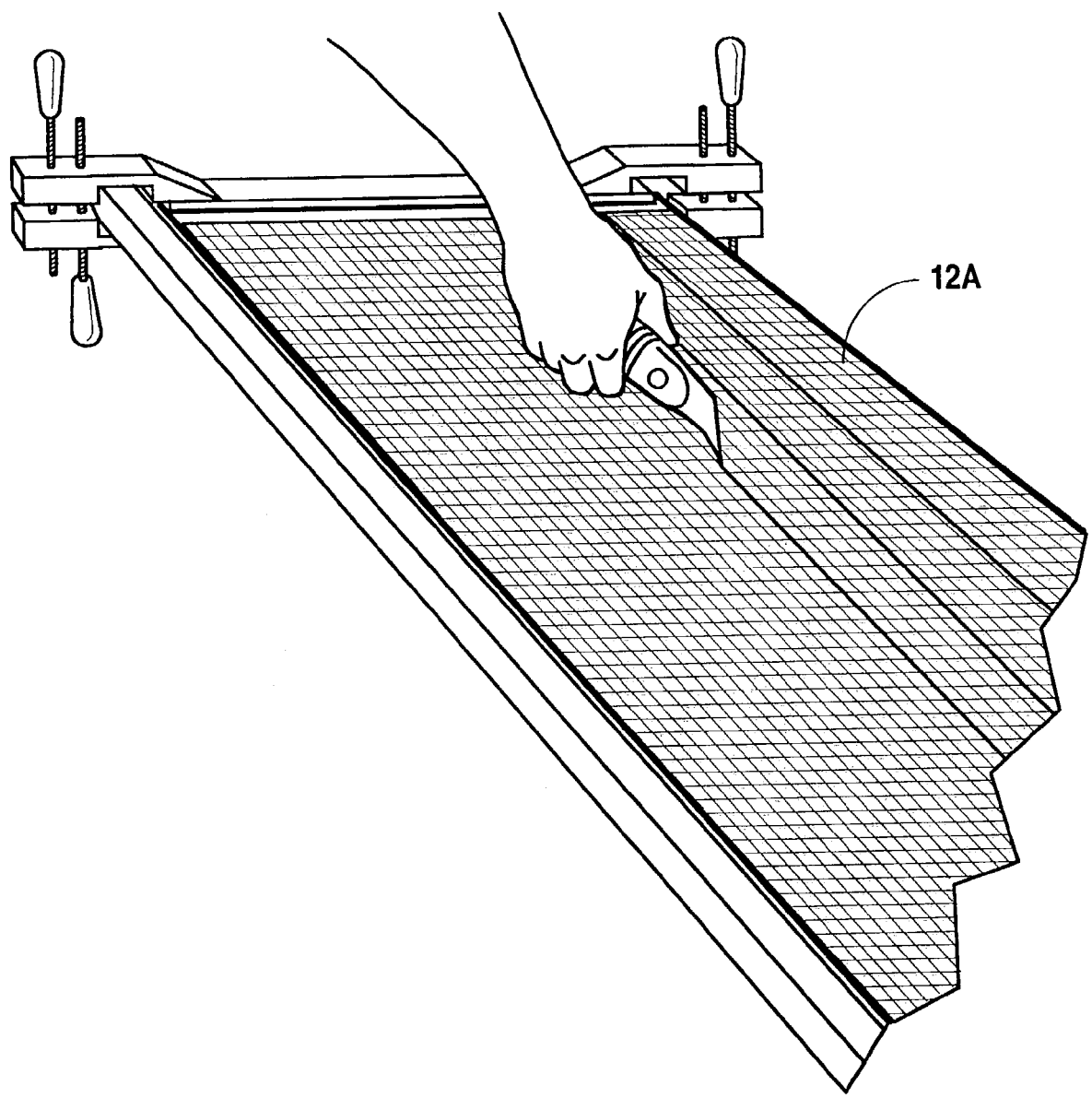
FIG. 14 is a perspective view of the cutting of gasket tape stock into tape.

Following a period of curing the resulting gasket tape stock as illustrated in FIG. 14 may be cut longitudinally, covered with a top layer of FEP and rolled into a roll resulting in the gasket tape 16 illustrated in FIG. 7.

This tape may be then used in lining aluminum structural members of the frame of aircraft such as those in cargo bays and also on aluminum mating surface beneath lavatories and galleys, where moisture may be a problem. This will help prevent access of moisture to the structural member. It is noted that use of Applicant's tape or gaskets will be self sealing around fasteners hole. This occurs when there is some defamation of the tape or gaskets at their edges under compression between the two joined mating surfaces.

In summary, it may be seen that Applicant's unique method of manufacturing either the tape or the prevent gasket includes the step of flattening the skeletal member against a flat surface, typically a table top and more typically table top against which a flat release film such as an FEP film has been placed thereon. It is seen that a curable liquid mix is combined and applied in liquid form, to cover the skeletal member to a depth sufficient to insure that the skeletal member is closer to the bottom surface of the resulting stock then to the upper surface. It is further seen that the resilient body liquid mix is typically self leveling and will cure at room temperature. The resulting stock may be then precut to a desire shape or cut to a preselected width and rolled up in a form of gasket tape. It is further seen that the gasket tape, as illustrated in FIG. 7 is provided with a first protected film 18A and a second protective film 18B, typically FEP and that after by cutting, the precut gaskets are typically covered top and bottom with the same protective FEP film.

Figure 15:
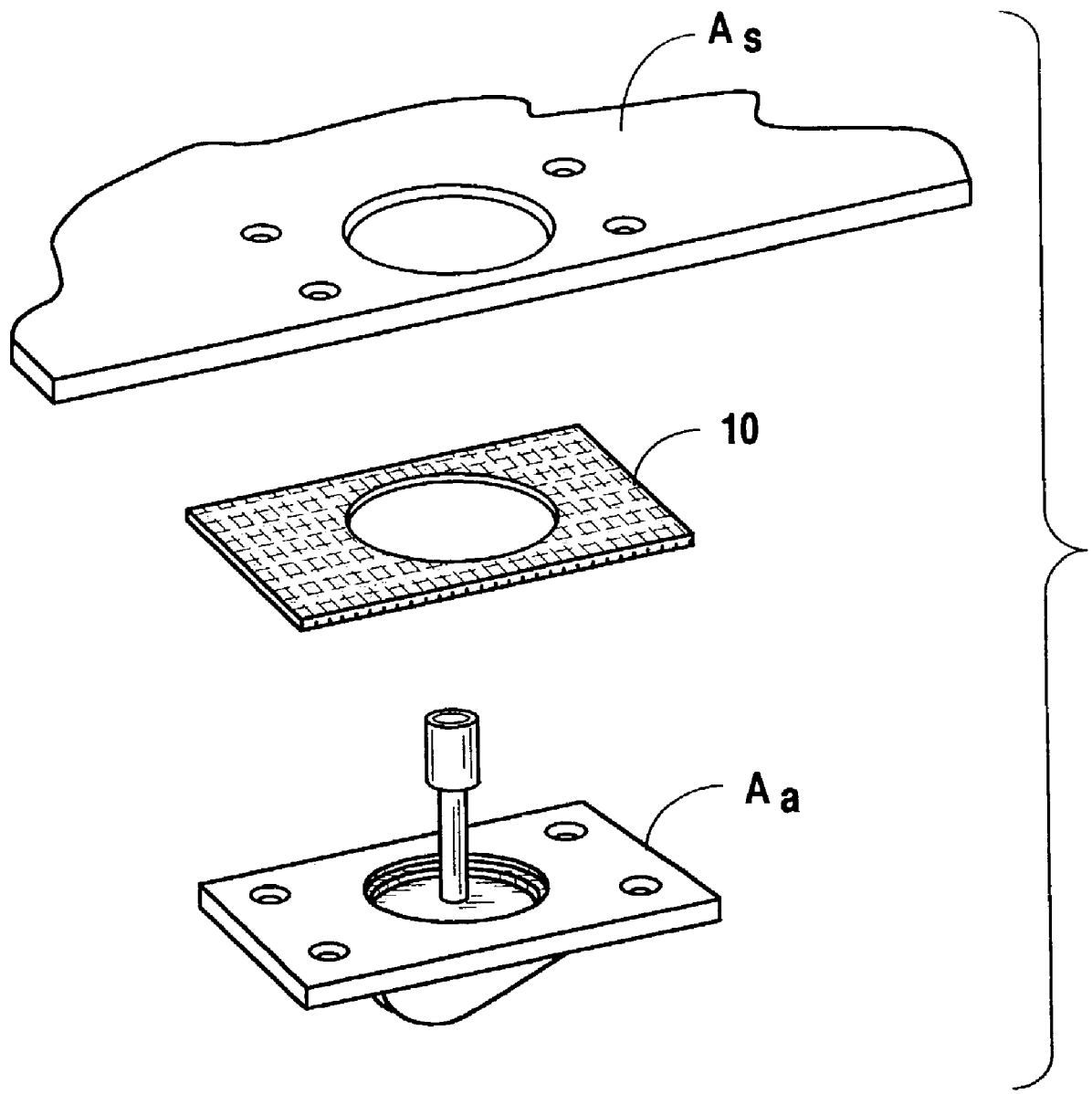
FIGS. 15, 15A and 15B illustrate a method of using Applicants preformed gasket with a liquid, curable mix with a preformed gasket to provide an effective gasket seal between an aircraft skin and an aircraft antenna.
Figure 15A:
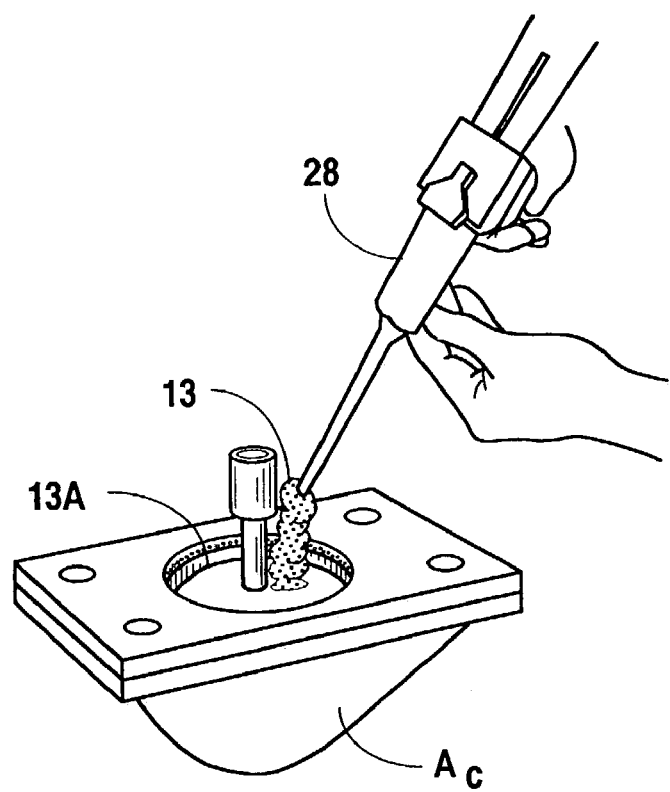
Figure 15B:
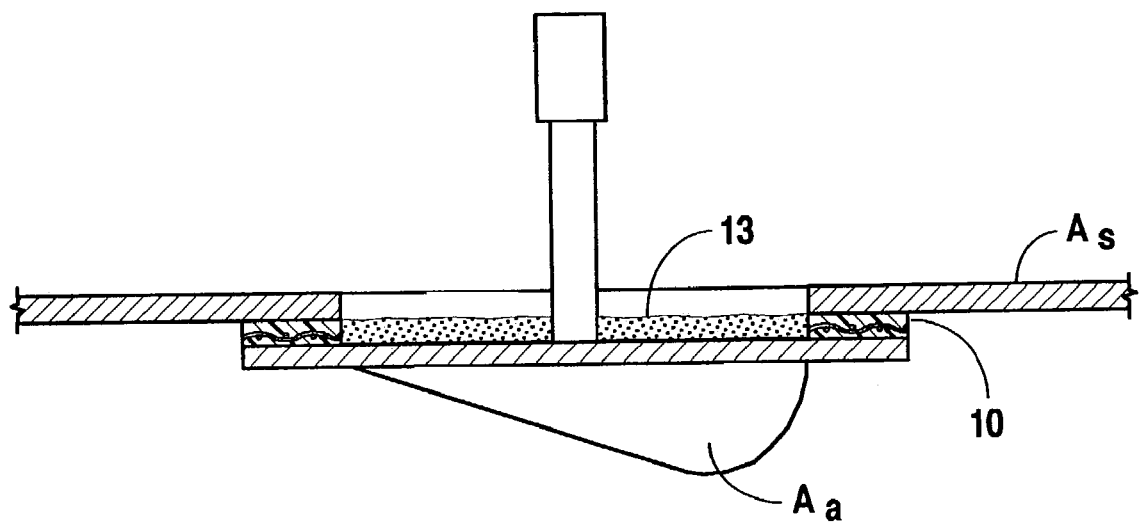

FIG. 15 shows Applicants preformed gasket 10 ready for installation between two mating surfaces As and Aa. FIG. 15A illustrates the use of non-preformed pliable sealant mix 13, typically a resin and a hardener, more typically a polyurethane curable mix. Mix 13 will set in place, and may fill any central cut-out areas 13A in gasket 10. This will often protect against the trapping of moisture in such area. Note that this curable mix should have the beneficial properties of the resilient body of Applicants preformed gasket 10. Such curable mixes are available from KBS Chemical of Fort Worth as U-1020 and P-1021.

Applicants provide for a novel variation of the gasket or gasket tape heretofore disclosed. More specifically, Applicants provide in FIGS. 16A through 19H a novel gasket material (50) and a method for making the same. Applicants novel variation of the gasket material heretofore disclosed includes an open cell foam base or substrate (54) at least partially saturated (typically saturated) with a polyurethane mix (52). One such open cell foam substrate (54) is available from Reilly Foam Corporation of Conshohocken, Pa. as "100 PPI Z."

The new gasket material may be configured in short strips, patches, washers, sheets or tape. The foam provides open cells which allows the gasket material to at least partially absorb a poured, liquid polyurethane mix which would typically cure at room temperature. The polyurethane mix (52) may be the same formulation used in the specifications set forth with the earlier embodiment. That is, the polyurethane mix (52) used in Applicants novel foam based gasket or gasket tape is available through KBS Chemical of Fort Worth, Tex. as Part No. P-1011 (Polyol) and U-1010 (Urethane). The polyurethane mix contains no silicone. Having no silicone oil means there is no silicone residue on the aircraft. Further, prior art gasket tape having a foam base (54) utilizing a silicone base mix would have a tendency to release silicone oil and thereby contaminate the substrate surrounding area and "lose" some of the actual sealing compound; especially under continuous compression and thermal cycling. Applicants novel gasket material with the polyurethane mix does not dry up or harden, even in extreme dry and cold. As such, Applicants novel gasket material using a foam base and a polyurethane mix (52) has a favorable application in the aircraft industry, as set forth in more detail below.

Applicants polyurethane mix or fill will typically at least partially saturate the foam substrate prior to curing. It will cure to form an elastomeric, solvent resistant, pliable material that will maintain its elasticity and pliability between about −65° C. and 135° C. Among the advantages of Applicants novel gasket material using a form substrate is that the material will not compression set. There is no silicone oil residue before, during or after installation or removal. Therefore, there are no problems with paint adhesion or preparation and no peripheral silicone contamination. It maintains excellent retentivity and may be stretched when applied if used in a tape form. Thus, in a tape form, it is excellent for wrapping cables such as coaxial cables. It provides a high level of tack compared to most other gasket materials and therefore is effective at corrosion protection. It is easily installed and, because it does not dry out, may be easily removed well after original installation.

Applicants novel gasket material with the foam base and the polyurethane mix is not reactive to polyethylene or aluminum. It is solvent resistant (ASTM D-543, water, polypropylene glycol/water, skydrol LD-4, MIL-H-5606, JET A) without degradation of physical properties. It passes FAR 25.853a.

All of these advantages and benefits provide for a gasket material that has numerous applications in the aviation industry, Applicants material may also be used wherever a protective wrap or gasket is needed. Indeed, numerous marine and land-borne vehicle applications are anticipated. Because Applicants gasket or sealant material is flexible and extensible, it can accommodate a number of complex forms.

Figure 16A:
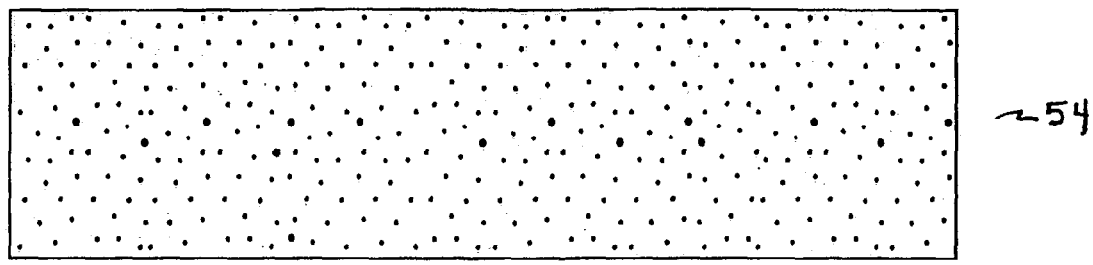
FIGS. 16A, 16B, 16C and 16D are three alternate preferred embodiments of Applicants novel gasket material featured in at least partially saturated foam core, these three views being side cross-sectional views.
Figure 16B:
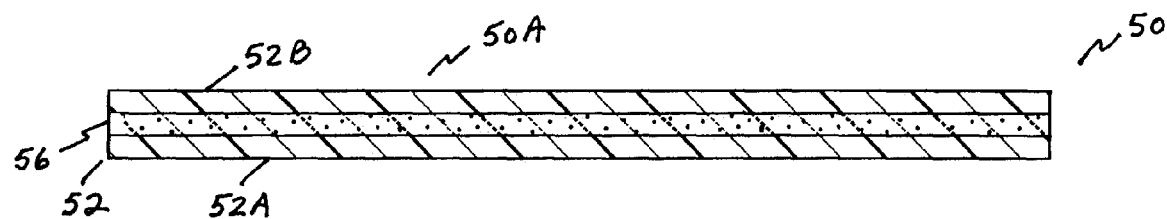
Figure 16C:
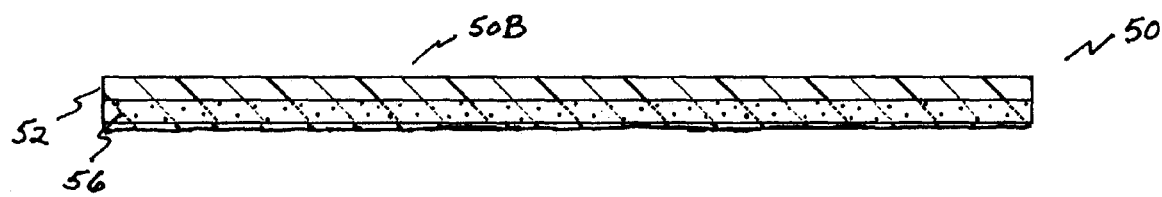
Figure 16D:
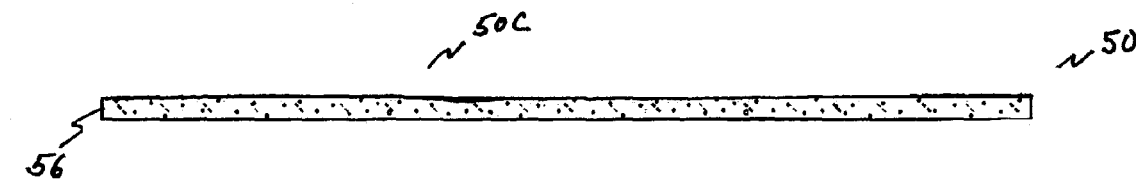

FIG. 16A illustrates Applicants dry, open cell foam substrate (54) before the mix is added. FIGS. 16B, 16C and 16D are side views cut away of Applicants gasket material (50). In FIG. 16B, it is seen that one embodiment includes a gasket material (50A) with a cured polyurethane mix (52) forming a bottom surface (52A) and a top surface (52B) to an at least partially saturated polyurethane foam core (56). In the embodiment of gasket material (50A), it is seen that core (56) is centrally located between top and bottom surfaces (52A and 52B) of cured polyurethane mix. On the other hand, it is seen with reference to FIG. 16C, that the at least partially saturated foam core (56) has a layer of cured polyurethane mix (52) on one side of the foam core and a thinner layer or, in an alternative, no layer on the other side.

FIG. 16D illustrates a third embodiment of gasket material (50C), which gasket material is comprised of simply the at least partially saturated core (56), with no layers of cured mix on either side ("naked"). Thus, it is seen that Applicants novel gasket material (50) may come in different forms.

First, it may include an at least partially saturated core (56) which may stand alone, or which may have, on one side or the other (or on both sides) a layer of cured polyurethane mix (52). Indeed, as in the mesh substrate embodiment above (see for example, FIG. 2), the core may be closer to the bottom of the gasket than to the top. That is, the core need not be centered as illustrated in FIG. 16B. Applicants have found that when the core is closer to one side of the gasket than the other (see for example FIG. 16C), there is a tackiness differential between the two surfaces. With a more tacky surface on one side, and used as a connector or cable wrap, it is found to be effective to wrap the tackier side to the inside, against the connector or cable.

Figure 17A:
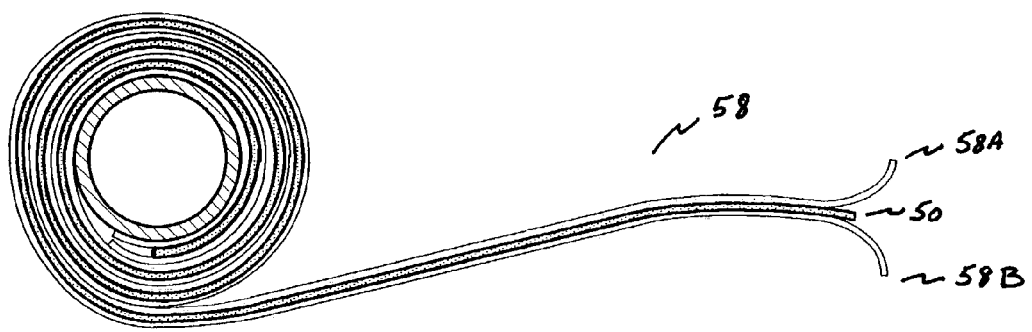
FIGS. 17A, 17B, 17C and 17D illustrate elevation of the use of a number of applications of Applicants alternate preferred embodiment of a gasket material.
Figure 17B:
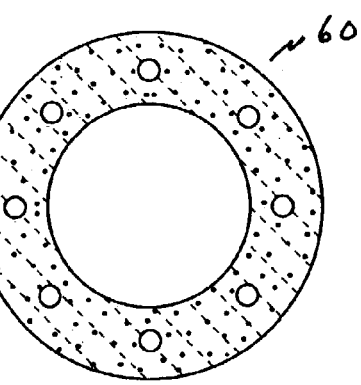
Figure 17C:
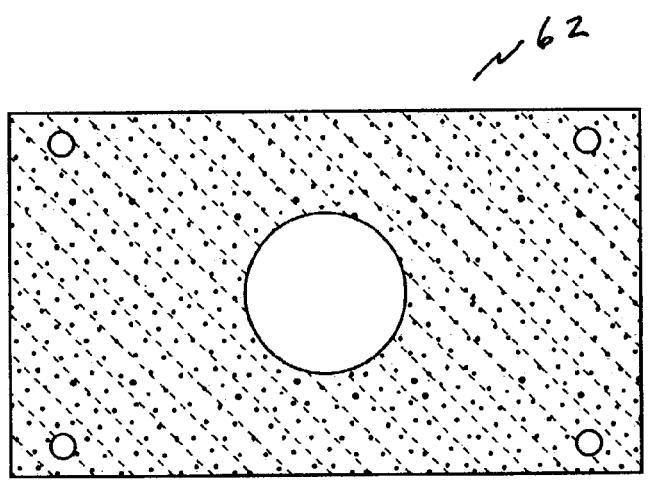
Figure 17D:
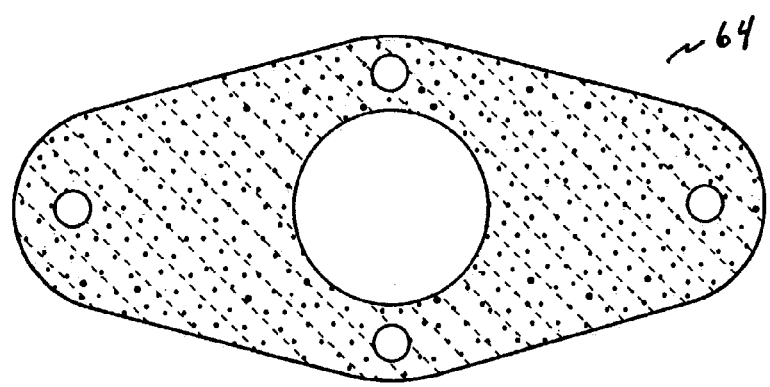
Figure 18:
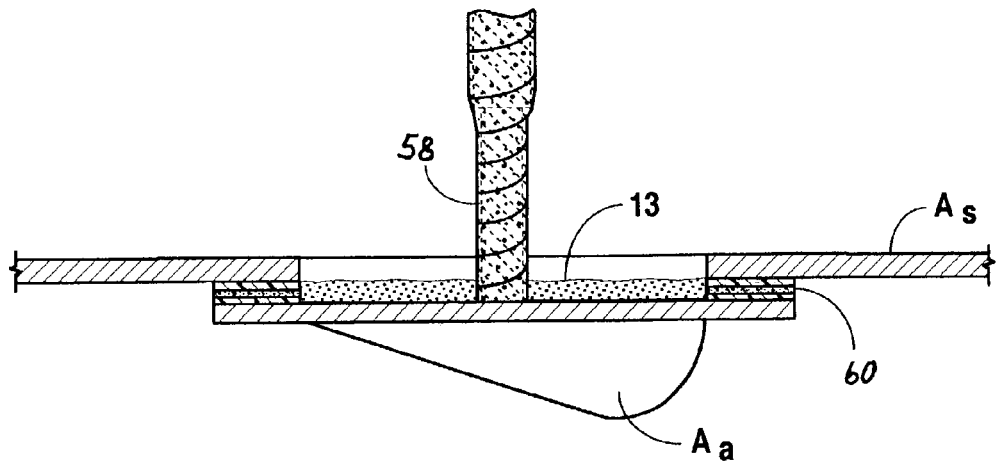
FIG. 18 is a side elevational view featuring one use of the alternate preferred embodiment of Applicants novel gasket material.

FIGS. 17A through 17D illustrate a number of forms which Applicants novel gasket material (50) may take. These include tape (58) wherein the top and bottom surfaces of the gasket material (50) may include protective sheets (58A and 58B). Applicants novel gasket material (50) may also be shaped to form a washer (60) as in FIG. 17B, a rectangular gasket (62) as in FIG. 17C and other complex shapes (64) such as illustrated in FIG. 17D. That is, Applicants novel gasket material (50) may be used a wrap and, since it is stretchable and sticks to itself as well as the work piece (such as a cable), it may hold the work piece under slight compression. On the other hand, it may be used under compression for intimate contact between two surfaces such as an antenna gasket. Some of these uses are illustrated in FIG. 18 wherein an Aircraft antenna Aa is mounted to Aircraft skin As and a washer (60) is provided as well as a wrap (58).

FIGS. 19A through 19H illustrate a preferred method of making Applicants novel gasket material (50). In some respects, this method is similar to that disclosed with the previous embodiment. These steps may be broken down into three general categories. First, preparing the table (24). Second, pouring polyurethane mix (52) on to the table. Third, combining the foam and mix. The mix is then allowed to cure and the gasket material (50) is removed from the table.

Figure 19A:
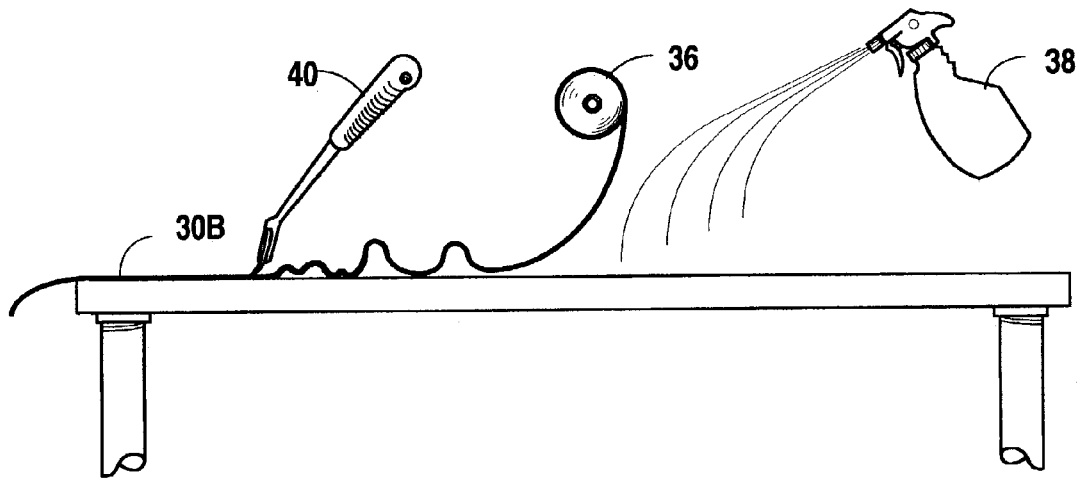
FIGS. 19A, 19B, 19C, 19D, 19E, 19F, 19G and 19H illustrate a method of preparing the alternate preferred embodiment of Applicants novel gasket material.
Figure 19B:
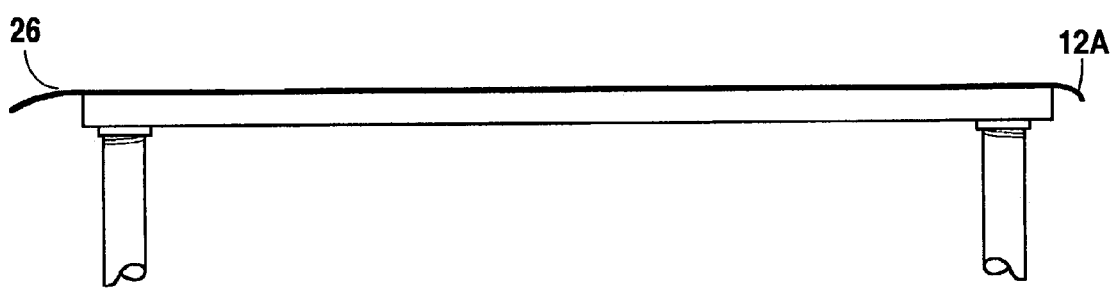

FIGS. 19A and 19B illustrate the method of preparing the table. A flattop table (24) is provided typically including a flat, transparent glass member (24A). A release sheet (36) such as a sheet of FEP is laid across the table after the tabletop is sprayed with a cleaner (38) or water. Bubbles are usually squeegeed out using a squeegee (40).

Figure 19C:
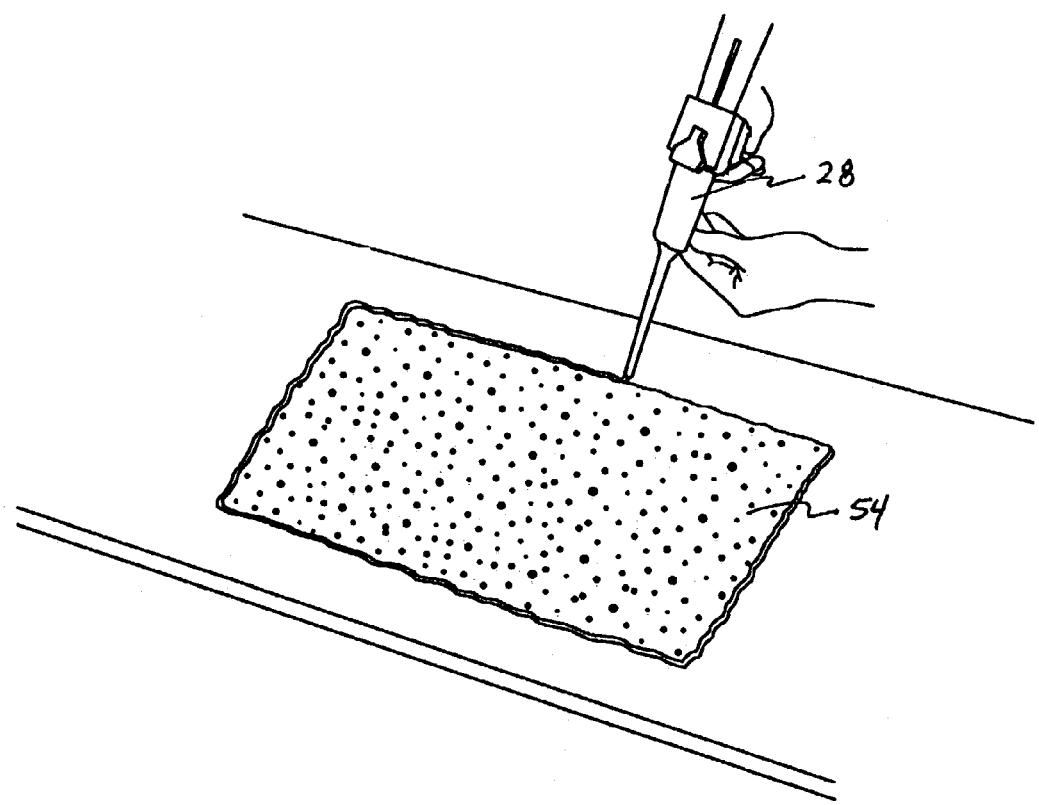
Figure 19D:
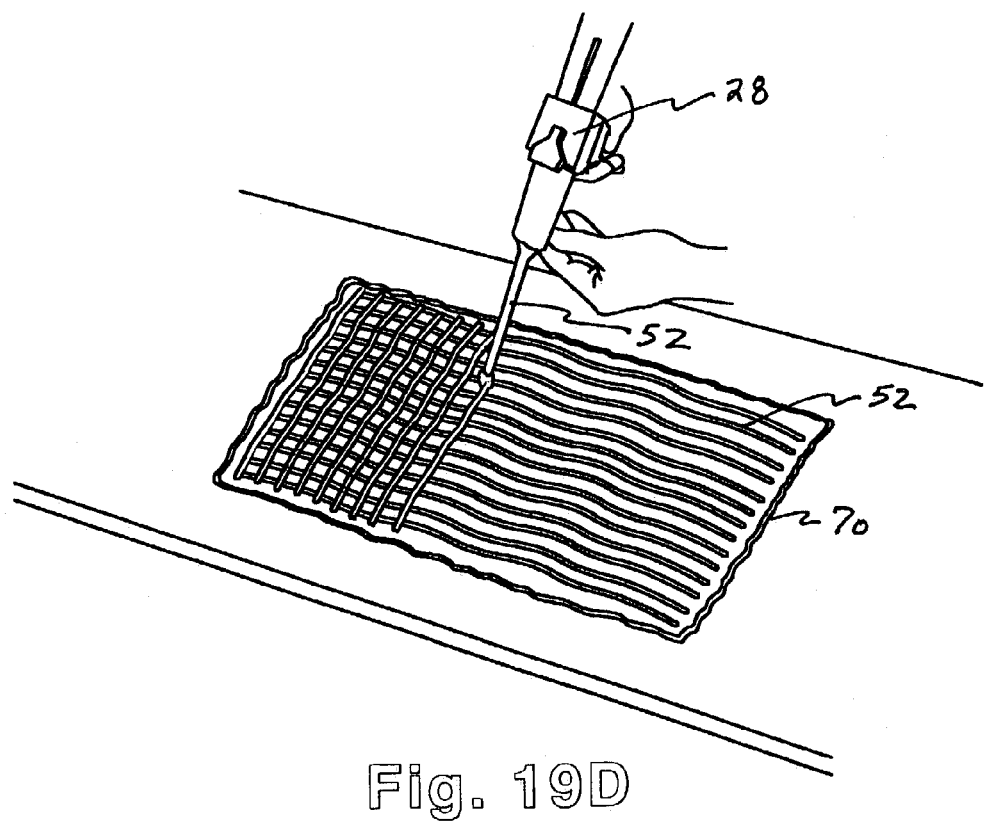
Figure 19E:
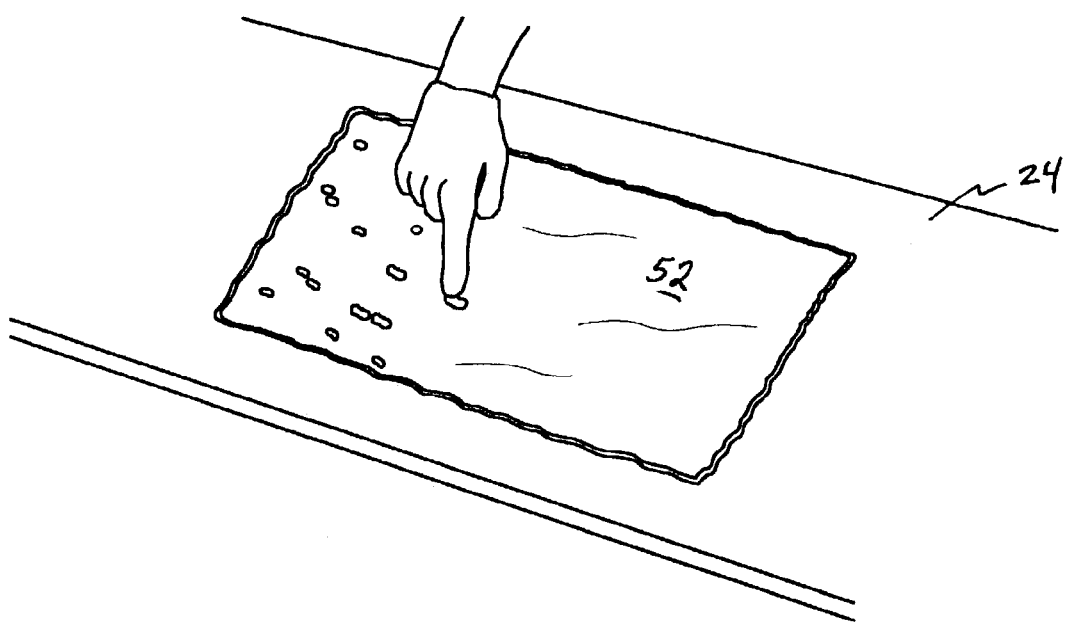
Figure 19F:
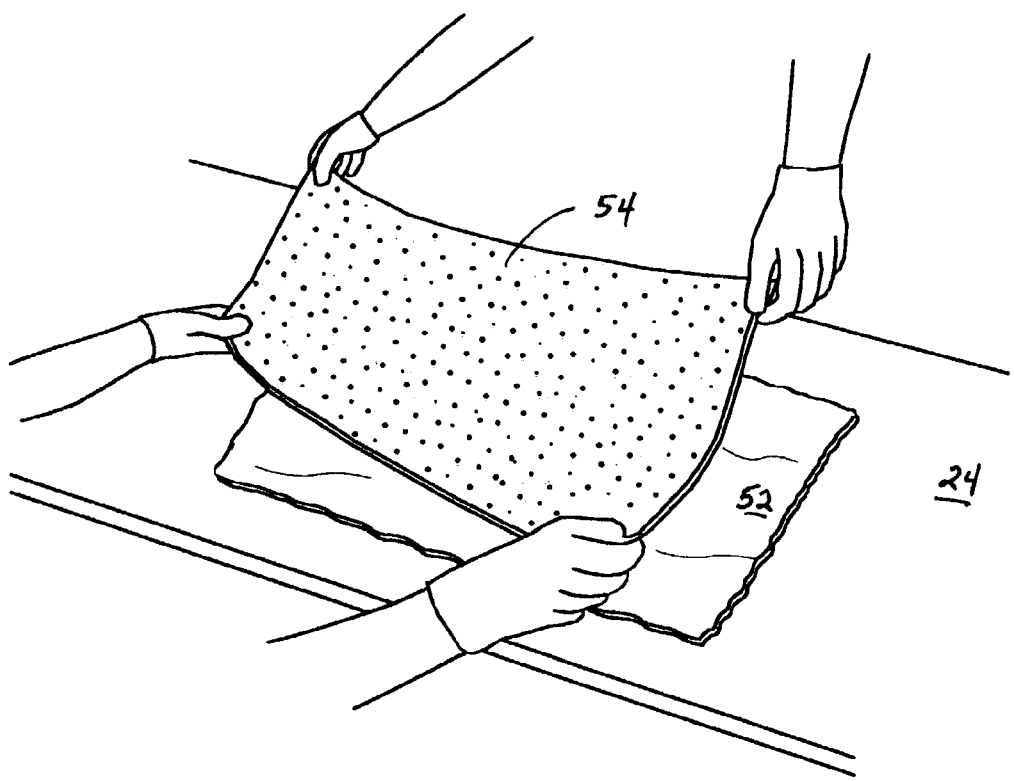
Figure 19G:
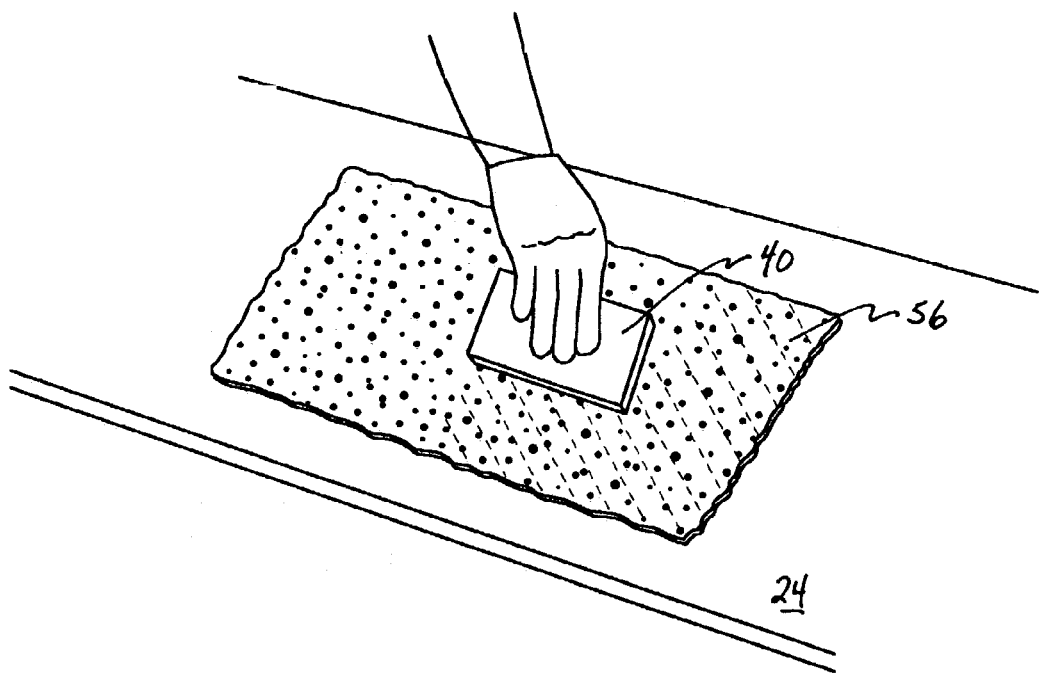
Figure 19H:
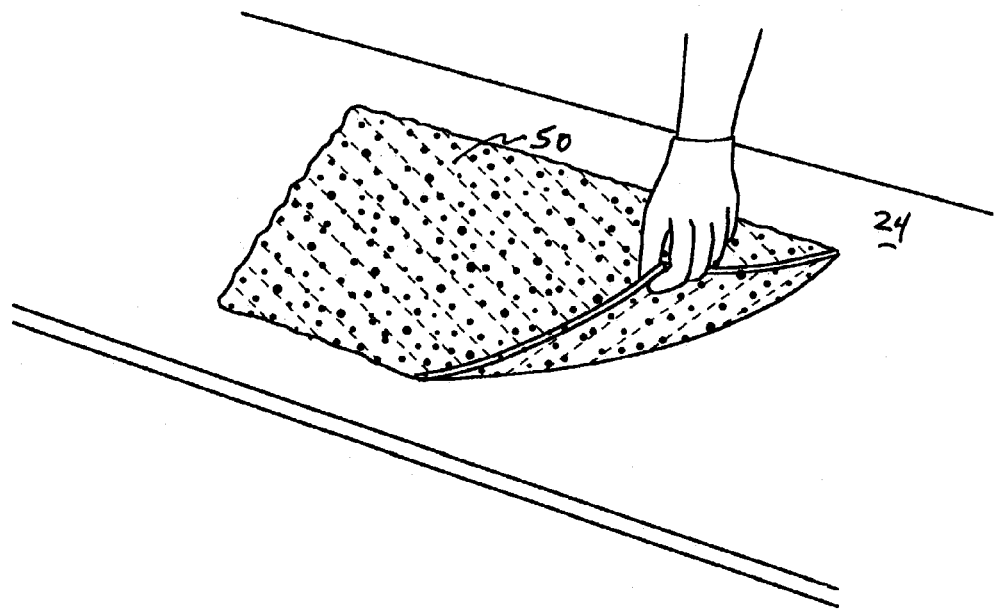

FIG. 19C shows a sheet of dry of open cell foam substrate (54) laying on top of the table (24) and more specifically shows the step of applying a polyurethane border (70) around the sheet of foam, but typically not touching the foam edges. This border is used to define area in which the mix will be laid, which is illustrated in FIG. 19D. Turning back to FIG. 19C, after the border is applied, the sheet of foam (still dry) is removed and now the step of layering mix as illustrated in FIG. 19D is commenced. In this step, a gun or applicator (28) filled with mix (52) is used. Applicator (28) typically has a nozzle that will allow the polyol and urethane to combine as it is being applied. The criss-cross action has been found to be an effective method of application of the mix on the table enclosed by border (70). The mix is typically self-leveling and the criss-cross pattern will cause it to flow together, somewhat. However, manual manipulation, such as that illustrated in FIG. 19E may assist the mix (52) to level. Note the worker manipulates the mix into the dry areas in FIG. 19E. FIG. 19F illustrates the placement step wherein the foam substrate 54 is placed on the leveled mix 52. FIG. 19G illustrates the step of soaking wherein the dry open cell foam substrate (54) becomes at least partially saturated with polyurethane mix (typically saturated). Manual pressing on the surface of the foam as well as squeegeeing (illustrated) will assist in urging the polyurethane mix (52) into the substrate (54). After desired degree of saturation is reached, the polyurethane mix (52) is allowed to cure. After curing, typically at room temperature for approximately two hours, the gasket material (52) is lifted from the table as illustrated in FIG. 19H.

If one desires that the at least partially saturated foam substrate core (56) should have a top and bottom layer of polyurethane mix (52) as illustrated in FIG. 16B ("sandwich"), then a greater volume of polyurethane mix, both above and below the core is required. That is, one can control the existence of or the thickness of a polyurethane mix layer outside the core by increasing the volume of polyurethane mix applied. If only a saturated core is desired with more substantial polyurethane mix extending beyond the boundaries of the core, then the core can be squeegeed clean of any excessive mix before curing.

For example the following procedure may be used for one desiring a "naked" saturated foam core with no layer of cured polyurethane on either side. A 12 inch by 36 inch 0.070 inch thick foam sheet of the type described above is placed on the table. About 150 cc of polyurethane mix is placed in the dispenser. The steps described above are undertaken and about 30 cc of uncured mix is squeegeed off the top of the saturated foam core, with the edge of the squeegee resting gently up against the top surface of the saturated foam core when the squeegee is drawn across the foam core. The estimate of 30 cc's may be made by placing the excess mix on a piece of FET paper and weighing it.

For preparation of a "one-sided" material one would simply squeegee off less than the excess squeegeed off to make a naked foam core. For example, if about 20 cc's is removed from the original 150 cc's applied, this would result in about a 0.005 inch layer of cured mix. The thickness may be estimated and a shinier finish results when a layer of mix is provided as compared to the "naked" foam. Removal of excess mix may be verified by weighing. Use of this procedure with the 0.070 inch thick foam results in a thickness of about 75 mil plus or minus 10%.

For the "sandwich" variety of gasket material (mix extending from both sides of the core) one would proceed as in the paragraph above but allow the top layer to cure. After the top layer is cured the work piece is flipped over and in about 30 to 40 cc's of mix is applied to the reverse side of the foam allowed to level and squeegeed to provide a total thickness of, typically about approximately 0.090 inch.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

The invention claimed is:

1. A method of using a gasket material with a workpiece, the workpiece having two parts, the two parts being aircraft parts of an aircraft, the method comprising:
   providing a gasket material that selectively adheres to one of the two pieces of the workpiece more readily than the second of the two pieces of the workpiece;
   placing the two pieces of the workpiece together with a gasket between the pieces of the workpiece;

first compressing the gasket between the two pieces of the workpiece;

repeatedly thermally cycling the workpieces;

after thermally cycling, removing the one piece of the workpiece from the other with the gasket material selectively adhere, maintain its integrity, and release cleanly from one of the two pieces and, following the removing step;

replacing the two pieces of the workpiece together with the same gasket material of the providing step between the two pieces of the workpiece; and second compressing of the gasket material between the two pieces of the workpiece.

2. The method of claim 1 wherein the gasket material of the providing step is at least partly comprised of a polyurethane mix.

3. The method of claim 1 wherein the two pieces of the workpiece include an aircraft skin and the other of the two pieces includes an aircraft antenna.

4. The method of claim 1 wherein:

the gasket material of the providing step is at least partly comprised of a polyurethane mix; and one of the two pieces of the workpiece include an aircraft skin and the other of the two pieces includes an aircraft antenna.

5. The method of claim 1 wherein the gasket of the placing step is silicon free.

6. The method of claim 1 wherein the gasket of the placing step has selective retentivity.

7. The method of claim 1 wherein the gasket of the placing step does not absorb more than about one percent water.

8. The method of claim 1 wherein the gasket of the placing step substantially retains its physical characteristics between −65° C. and 135° C.

9. The method of claim 1 wherein the gasket of the placing step is resilient.

10. The method of claim 1 wherein the gasket of the placing step is elastomeric.

* * * * *